(12) United States Patent
Lewis et al.

(10) Patent No.: US 9,253,235 B2
(45) Date of Patent: *Feb. 2, 2016

(54) STREAMING ENHANCEMENTS THROUGH PRE-FETCH BACKGROUND

(71) Applicant: AT&T Mobility II LLC, Atlanta, GA (US)

(72) Inventors: John Ervin Lewis, Lawrenceville, GA (US); Justin McNamara, Dunwoody, GA (US); Fulvio Arturo Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,709

(22) Filed: Nov. 19, 2014

(65) Prior Publication Data

US 2015/0074244 A1  Mar. 12, 2015

Related U.S. Application Data

(63) Continuation of application No. 12/342,912, filed on Dec. 23, 2008, now Pat. No. 8,938,548.

(51) Int. Cl.
| | |
|---|---|
| *G06F 15/173* | (2006.01) |
| *H04L 29/06* | (2006.01) |
| *H04N 7/173* | (2011.01) |
| *H04N 21/414* | (2011.01) |
| *H04N 21/433* | (2011.01) |
| *H04N 21/472* | (2011.01) |
| *H04N 21/63* | (2011.01) |
| *H04N 21/6543* | (2011.01) |
| *H04N 21/258* | (2011.01) |
| *H04N 21/845* | (2011.01) |
| *H04L 29/08* | (2006.01) |

(52) U.S. Cl.
CPC ............. *H04L 65/60* (2013.01); *H04L 65/604* (2013.01); *H04L 67/10* (2013.01); *H04N 7/17318* (2013.01); *H04N 21/41407* (2013.01); *H04N 21/4331* (2013.01); *H04N 21/47202* (2013.01); *H04N 21/632* (2013.01); *H04N 21/6543* (2013.01); *H04L 65/4084* (2013.01); *H04L 67/306* (2013.01); *H04N 21/25891* (2013.01); *H04N 21/8456* (2013.01)

(58) Field of Classification Search
CPC ................... H04N 21/44016; H04L 67/2847
USPC .......................... 709/204, 238, 203, 231, 232
See application file for complete search history.

(56) References Cited

U.S. PATENT DOCUMENTS

| | | | | |
|---|---|---|---|---|
| 6,463,508 | B1 * | 10/2002 | Wolf | G06F 12/0888 711/130 |
| 6,708,213 | B1 * | 3/2004 | Bommaiah | H04L 29/06 370/401 |

(Continued)

*Primary Examiner* — Phuoc Nguyen
(74) *Attorney, Agent, or Firm* — Baker & Hostetler LLP

(57) ABSTRACT

Media content that meets pre-fetching criteria may be distributed to the device, in a non-requested instance, and stored in the pre-fetched segments database. Rather than relying on caching methods for the first-time access of a media object, at least a portion of the media object may be pre-stored, prior to any requests for access, on the client's device. Thus, when a user attempts to access a particular media stream from the network, if the client's device already has a segment of the desired media object stored, the stored segment access can be directly from the client's device. To further efficiently use bandwidth, the distribution of the segment of a media object to be stored on a user's local machine, the distribution may be done out of band or based on a balance of network resources.

20 Claims, 8 Drawing Sheets

(56) References Cited

U.S. PATENT DOCUMENTS

| | | | |
|---|---|---|---|
| 8,959,244 B2 * | 2/2015 | Lin | G06Q 30/0241 709/231 |
| 2005/0165941 A1 | 7/2005 | Eytchison et al. | |
| 2006/0034583 A1 * | 2/2006 | Shimizu | G09B 5/065 386/353 |
| 2007/0203979 A1 | 8/2007 | Walker et al. | |
| 2008/0133839 A1 | 6/2008 | Schmidt et al. | |
| 2009/0292819 A1 | 11/2009 | Kandekar et al. | |
| 2014/0149596 A1 * | 5/2014 | Emerson, III | H04L 67/10 709/231 |

* cited by examiner

STREAMING ENHANCEMENTS THROUGH PRE-FETCH BACKGROUND

CROSS-REFERENCE TO RELATED APPLICATIONS

The instant application is a continuation of, and claims priority to, U.S. patent application Ser. No. 12/342,912, filed Dec. 23, 2008. U.S. patent application Ser. No. 12/342,912 is incorporated by reference herein in its entirety.

The increased popularity of streaming media has resulted in significant increases in user latency and network congestion. As the demand for delivery of continuous and/or on-demand streaming increases, the need for efficient delivery becomes increasingly important. Attempts are regularly being made to deliver multimedia content over the Internet in a more efficient manner to improve the performance of media streaming. Some techniques have shown some effectiveness, but the methods employed still possess deficiencies.

An example approach is to employ a proxy server that serves as an intermediary to an end-user and the content server. The proxy server can manage a proxy cache that accesses and stores media objects from the content server. When a client requests certain content, the proxy server, if it already has the requested media objects stored, can serve the client without contacting the content server. In this manner, some of the traffic between the end-user and the content server is shifted to an intermediary server. Typically, the proxy server will be selected based on geographical proximity to the clients such that the network path to the end-user is more direct.

However, the implementation and deployment of the attempted methods, such as the use of a proxy server, are deficient. It is often expensive to set up, manage, and maintain a proxy server. Latency still exists between the client and the proxy server, causing start up delay for first time access to a media object. The techniques for caching large segments of text, audio, and image objects are deficient for caching media streams, also resulting in start up delay. Further, the caching action isn't triggered until the client starts access to that object such that caching is only performed for the currently-accessed object.

SUMMARY

Disclosed herein are techniques for pre-fetching media content that involves downloading segments of selected media objects to a client's device. Rather than relying on caching methods for the first-time access of a media object, at least a portion of the media object may be pre-stored, prior to any requests for access, on the client's device. For example, media content that meets pre-fetching criteria may be distributed to the device, in a non-requested instance, and stored in the pre-fetched segments database. Pre-fetching criteria may be compiled based on a number of factors either individually or in combination, such as, but not limited to, a pre-fetch request list, a popular access list, a recommended pre-fetch list, a client profile, a carrier request list, or advertised media content. Thus, when a user attempts to access a particular media stream from the network, if the client's device already has a segment of the desired media object stored, the stored segment can be accessed directly from the client's device.

To further efficiently use bandwidth, the distribution of the segment of a media object to be stored on a user's local machine may be done out of band or based on a balance of network resources. Often users see a part of the media content and they decide they no longer desire that media object. Thus, to eliminate the distribution of unnecessary additional segments of the media object, a request for additional segments can be tied to a triggering event. For example, access by the user to a predetermined length of the stored segment may trigger the request for an additional segment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Figure 1:
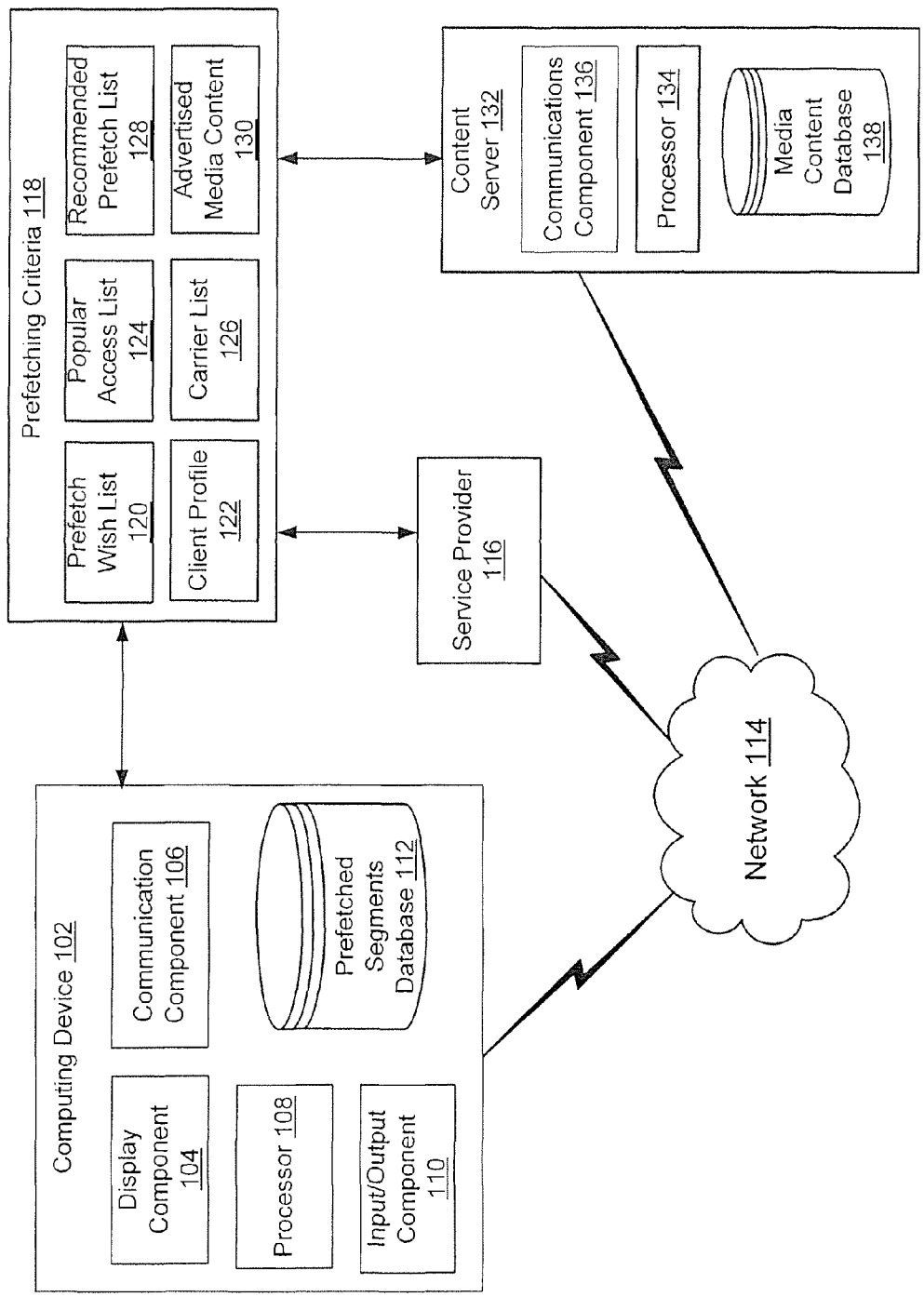
FIG. 1 depicts an example configuration of a system that can utilize the disclosed techniques.

Disclosed herein are techniques for pre-fetching media content that better utilizes bandwidth and can reduce network congestion. Prior to any requests for access to a particular media object, a content server can provide a segment of the media object to a user for storage on the user's local machine. The segments to be provided can be selected based on pre-fetching criteria, which can be based on a combination of user preferences, popular media access requests, content that is being heavily advertised by a carrier, recommendations, requests, or the like. Thus, rather than relying on caching methods for the first-time access of a media object, at least a portion of the media object may be pre-stored, prior to any requests for access, on the client's device. When a user attempts to access a particular media stream from the network, if the client's device already has a segment of the desired media object stored, the stored segment can be accessed directly from the client's device.

The aspects summarized above can be embodied in various forms. The following description shows, by way of illustration, combinations and configurations in which the aspects can be practiced. It is understood that the described aspects and/or embodiments are merely examples. It is also understood that other aspects and/or embodiments can be utilized, and structural and functional modifications can be made, without departing from the scope of the present disclosure. For example, although some aspects herein relate to methods of streaming a segment of a media object, it should be noted that distribution of the segment via the network to the user may be accomplished via any appropriate method. Similarly, although some aspects relating to storage of the media object segment on a device contemplate storing the segment on a computing device such as a laptop or desktop computer, it should be noted that any appropriate device for storage that can be accessed is contemplated.

Reference throughout this specification to "one embodiment," "an embodiment," "an example embodiment," or similar language means that a particular feature, structure, or characteristic described in connection with the embodiment is included in at least one embodiment of the present techniques disclosed. Thus, appearances of the phrases "in one embodiment," "in an embodiment," "an example embodiment," and similar language throughout this specification may, but do not necessarily, all refer to the same embodiment.

In the discussion that follows, details relating to computing devices and networks are assumed to be well known. Accordingly, such details are largely omitted herein for the sake of clarity and explanation. Furthermore, the described features, structures, or characteristics of the disclosed techniques may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosed techniques. One skilled in the relevant art will recognize, however, that the disclosed techniques may be practiced without one or more of the specific details, or with other methods, components, materials, and so forth. In other instances, well-known structures, materials, or operations are not shown or described in detail to avoid obscuring aspects of the disclosed techniques.

FIG. 1 depicts an example configuration of a system 100 that can utilize the disclosed techniques. The system may include a computing device 102, a service provider 116, and a content server 132 that may communicate over a network 114. Each of the device 100, service provider 116, or content server 132 may, separately or in combination with another, maintain, update, or contribute information to compile pre-fetching criteria 118.

The device 102 may be representative of any appropriate type of device, such as a computing device, or a set top box, or a cellular device that a user typically carries on his or her person. The device, as it is described herein, may include any device that may be utilized, for example, to receive and store a segment of data. According to example embodiments, the device 102 may be, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof. With respect to FIG. 1 and the discussions that follow, a reference herein to an example embodiment of a computing device 102 involving a cellular telephone, a set top box, or a desktop computer is solely for purposes of explanation, and is not intended to limit the techniques disclosed to any such embodiment.

The computing device 102 may include hardware components such as a processor, a graphics card, a storage component, a memory component, an antenna, a communication component, an input/output component such as a speaker, a display, a keypad, a microphone, or the like. The mobile device 102 may also include software components such as an operating system that may control the hardware components. In the embodiment shown in FIG. 1, the communications device 104 includes a display component 104, a processor 108, a communication component 106, an input/output component 110, and a pre-fetched segments storage 112, shown as a database. Each of these components may be interconnected to share resources and information. Media content may be text, audio, still images, animation, video, interactivity content forms or the like.

The display component 104 may be any form of display for the presentation of information for visual, audio, tactile reception, or the like. For example, the display component may be a common television set display, a computer monitor, a handheld LCD screen, or the like. The communication component 106 may include an antenna, communication port, or the like that may be used to establish a communication link with a network, such as network 114. The communication component 106 may then communicate with servers or the like over the network to connect the device with other computing components or servers, such as the content server 132 or the service provider 116.

The processor 108 of device 102 may include any appropriate type of processor such as a single processor, multiple processors that may be distributed or centrally located, or the like. For example, the processor 108 may be a desktop computing device processor, a mobile communications device processor, a handheld processor, or the like. The processor 108 may include or link to any other suitable hardware such as cache, Random Access Memory, storage devices, or the like and/or software.

The input/output component 110 may include, for example, an input component such as a keypad, a touch screen, a button, a microphone, or the like, and an output component such as a transmitter, a speaker, a microphone, or the like. A user may interact with the computing device 102 via the input/output component 110 to access various types of media content. For example, a user may select to listen, via a keyboard, an audio file, or select to view a video display on the display component 104. Often, a user will stream media content over a network, such as the Internet. For example, via a web browser viewable on the display component 104, the user may browse the Internet via the input/output component. The user may select or "click on" media files that are accessible from a carrier to download or stream to the user's local machine, such as computing device 102. As disclosed herein, media content may be distributed to the device 102, in a non-requested instance, and stored in the pre-fetched segments database 112.

In the example configuration shown in FIG. 1, the media content is stored in the media content database 138. The media content database 138 may be any form of data storage, including a storage module, device, or memory, for example. The media content database 138 may be provided as a database management system, an object-oriented database management system, a relational database management system (e.g., DB2, Access, etc), a file system, or another conventional database package. Further, the databases can be accessed via a Structure Query Language (SQL), or other tools known to one of ordinary skill in the art.

As shown in FIG. 1, a mobile device 104 may be in communication with a network 114. The network 114 may be any type of network such as the internet, a Local Area Network (LAN), a Wide Area Network (WAN), a cellular telephone network, or the like. For example, the network 114 may include the example networks described below in FIGS. 5-7 such as Global System for Mobile communication ("GSM"), General Packet Radio Service ("GPRS"), Universal Mobile Telephone System ("UMTS"), Frequency Division Duplexing ("FDD") and Time Division Duplexing ("TDD"), High Speed Packet Data Access ("HERMDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), WiFi, WiMAX, or the like.

The device 102 may be in communication with a service provider 116 via the network 114. A service provider 116 may be any entity that provides services, usually via a subscription or web service, to business or individuals. For example, the service provider 116 may be a network or internet service provider, a cellular telephone provider, an application service provider, a managed service provider, a cable service provider, or the like. The network 114 may be operated by the service provider 116.

According to an example embodiment, the network manager may offer bandwidth and/or network access to subscribers thereof to enable communication between the subscribers and other devices such as cellular phones, PDAs, PCs, Voice over Internet Protocol devices, analog telephone devices, or the like. In one embodiment, the bandwidth and/or network access provided by the network provider may be utilized to distribute media objects to clients or subscribers.

The device 102 may operate in a cellular, SMR, PCS, cordless, unlicensed AWS, 700 MHz, or other spectrums and communicate with a service provider or carrier via satellite, radio waves, or cables. However, embodiments are not limited to those with network access, and the embodiments that describe network access are not limited by a network servicing the device. Accordingly, embodiments may be applicable to any network type including, for example, TDMA, CDMA, WCDMA, GSM, WiFi, WiMAX, OFDM, UMTS, EV-DO, HSDPA/HSUPA and other standards now known or to be developed in the future.

The device 102 may be in communication with a content server 132 via the network 114. The content server 132, similar to the device 102, may be any device suitable for accomplishing the techniques disclosed herein. Similar to device 102, the example content server may include an input/output component, a communications component, a processor, and software components such as an operating system that may control the hardware components.

The example content server 132 shown in FIG. 1 comprises a processor 134, a communications component 136, and access to a media content database 138. The content server 132, similar to the device 102, may be any device suitable for accomplishing the techniques disclosed herein. The content server 132 is a device that can interconnect with other servers, communicate via the network 114 to subscribers, service providers 116, or the like, and store or have access to media content.

The input/output component 110 may include, for example, an input component such as a keypad, a touch screen, a button, a microphone, or the like, and an output component such as a transmitter, a speaker, a microphone, or the like. The communication component 106 may include an antenna, communication port, or the like that may be used to establish a communication link with a network, such as network 114. The communication component 106 may then communicate with servers or the like over the network to connect the device with other computing components or servers, such as the content server 132 or the service provider 116.

The processor 108 of device 102 may include any appropriate type of processor such as a single processor, multiple processors that may be distributed or centrally located, or the like. For example, the processor 108 may be a desktop computing device processor, a mobile communications device processor, a handheld processor, or the like. The processor 108 may include or link to any other suitable hardware such as cache, Random Access Memory, storage devices, or the like and/or software.

In the example configuration shown in FIG. 1, the media content is stored in the media content database 138. The media content database 138 may be any form of data storage, including a storage module, device, or memory, for example. The media content database 138 may be provided as a database management system, an object-oriented database management system, a relational database management system (e.g., DB2, Access, etc), a file system, or another conventional database package. Further, the databases can be accessed via a Structure Query Language (SQL), or other tools known to one of ordinary skill in the art.

The media content database 138 may contain an inventory of media content information, such as a structured collection of records and/or data associated with various service providers, devices and users/entities associated with service provider or a device, such as device 102, networks that support communication with the devices on the network 114, etc. The media content can include media from a cable network carrier, a music site, a video rental entity, or the like. The information in the media content database 138 may be structured to enable a person or program to extract desired information to share information to the user. For example, if the processor 134 updates the media content database 138 with new media content, the processor 108 of device 102 or the service provider 116 may have access to such information by searching the database.

Thus, a user, via device 102, may request media content from the content server 132. For example, a user may be on a web browser and request access to media content, such as an audio file or video file. The web browser may be that of a service provider 116. The service provider may manage the content server 132 directly or obtain access via the network 114. If the service provider manages and accesses the content server 132 directly, the content server may include media content that is specific to that service provider. For example, if the service provider is a provider of video clips that users upload and download to the site, the media content database may store the uploaded videos for distribution to verified users upon request.

Disclosed herein are techniques for pre-fetching media content from an entity that provides or manages media content, such as the described content server 132. Prior to any requests for access to a particular media object, a content server can provide a segment of a media object over the network for storage on the user's local machine. The segments to be provided can be selected based on a compiled set of pre-fetching criteria, as represented by pre-fetching criteria 118 in FIG. 1. A suitable entity, such as the device 102, the service provider 116, and the content server 132, may access, update, or maintain pre-fetching criteria and use it to determine media content that should be distributed prior to any requests. For example, if a media object meets the pre-fetching criteria, a segment of the media object may be distributed for storage on a user's local machine. Thus, if the user attempts to access that media content over the network, such as via a service provider's web site, the first segment of the media object is already locally stored.

It is noted that the first segment refers to a first segment of a media content that is distributed and stored on a user's local machine, but does not necessarily need to be the beginning segment of media content. Rather, the first segment is any portion of the media content that is selected for distribution and stored locally for implementation if a user attempts to access the media content. The pre-fetching content can be linked anywhere in a live stream. For example, a news report can have several background studio shots based on the camera being fixed. These backgrounds can be pre-fetched and intermixed with the live stream, reducing the bandwidth need of the live stream. The user's device may implement the locally stored segment, such as by playing, viewing, accessing, or otherwise accessing the locally stored segment, which may be, for example, at least one of text, audio, images, animation, video, or interactivity content. The local access reduces the congestion on the network and also provides for faster start-up access to a media object for the user, especially for first-time access.

Pre-fetching criteria may be compiled based on a number of factors either individually or in combination, such as, but not limited to, a pre-fetch wish list 120, a popular access list 124, a recommended pre-fetch list 128, a client profile 122, a carrier request list 126, or advertised media content 130.

Pre-fetching criteria may use a popular access list 124 to determine what media content to distribute. For example, a popular access list may be a list of content that is commonly accessed by users that request media content from the service provider or the content server. Thus, if a particular video or a particular song is commonly accessed, a segment of the media object that make up that video or particular song may be distributed to a client's local machine.

A carrier list 126 may be a compilation of media content that a particular carrier, such as a cable company, provides or wishes to distribute. For example, a cable company may spotlight particular movies that they predict will be heavily accessed online or a music production company may select a song that is being released for which they expect to cause heavy network traffic due to requests for the corresponding media content. An advertised media content 130 compilation may be content that is heavily advertised, such as by a carrier, that may be expected to generate excessive network traffic.

A client profile 122 may be maintained by any appropriate entity, including the client, to set user preferences or monitor the user's history of access or user tendencies. For example, a user may set preferences that may be used to filter media content, e.g., selected movie genres, favorite actress, etc. The client profile 122 may include demographic information about the user, such as age, address, interests, etc. In another example, the user may routinely search videos based on a particular keyword (e.g., doberman, skateboarding, etc), the user may watch a particular television show online or commonly request new movie releases to download before going on travel or before the weekend. The user's device may be set up to monitor the user's usage or the user's travel plans (such as via a personal planner program) and add appropriate content to the pre-fetch wish list.

A pre-fetch wish list 120 may be a compilation made by the user from the user's machine. For example, a user may utilize the disclosed techniques such that new movie releases or any audio files with a particular singer are part of the media content that is pre-fetched and distributed to the user's local machine. In another example, the user subscribes to a service for online rentals or downloads of particular content, and a user's queue may determine the pre-fetch wish list 120. The user may or may not access the content from the pre-fetch wish list, but if they do, access to at least a first segment of the locally stored media content provides the user with faster and more efficient access.

A recommended pre-fetch list 128 may be compiled on behalf of a user, such as by a carrier or a service provider 116. The recommended pre-fetch list 128 may utilize a combination of the compilations. For example, the selection of media content based on pre-fetching criteria can be filtered on behalf of a specific user, such as using information from the pre-fetch wish list 120 or the client profile 122 along with other pre-fetching criteria, such as the popular access list 124. In this example, the popular access list 124 can be filtered by features in the client profile 122, selecting media in the popular access list that has been accessed by clients with the same or similar features as those in the client profile 122. Thus, the recommended pre-fetch list 128 may use the client profile 122 or pre-fetch wish list 120 to filter media content for distribution. Alternately, the client profile 122 and/or pre-fetch wish list 120 may be used alone to filter the media content.

Using the pre-fetching criteria to select media content for distribution, at least a portion of the media object may be distributed and pre-stored, prior to any requests for access, on the client's local device, such as device 102. When a user attempts to access a particular media stream from the network, if the client's device already has a segment of the desired media object stored, the stored segment access can be directly from the client's device. In many circumstances, direct access is more desirable than relying on caching methods, particularly for the first-time access of a media object.

Distribution of the first segment may be in the form of streaming, downloading, broadcasting, multicasting, or any other suitable method of providing the segment for storage on the user's device 102. Multicasting may be employed to target a specific group of subscribers with pre-fetched media content. Employing a multimedia broadcast multicast service (MBMS) enables a service for broadcasting for cellular networks, such as GSM and UMTS cellular networks. The MBMS is structured to enable use of an uplink channel for interaction between the service and the user, using multicast distribution in a core network instead of point-to-point links for each device.

To further efficiently use bandwidth, the distribution of the segment of a media object to be stored on a user's local machine, the distribution may be done out of band or based on a balance of network resources. The distribution may occur out of band on a stream that is separate from the main data stream. Furthermore, the distributor of the segment may distribute based on a balance of network resources. The network balance may be both network-aware and stream-aware, taking into account bit rate requirements required to distribute the media object, the available bandwidth between clients and servers, and the like. The network balance may account for a particular user or geographic region, such that the distribution occurs when particular users are less likely to be accessing the network (e.g., distribute when the client is sleeping or idle for a particular amount of time). Network idle time and network type may also be evaluated to determine which type and at what times a distribution of media content most efficiently utilizes available bandwidth.

Figure 2:
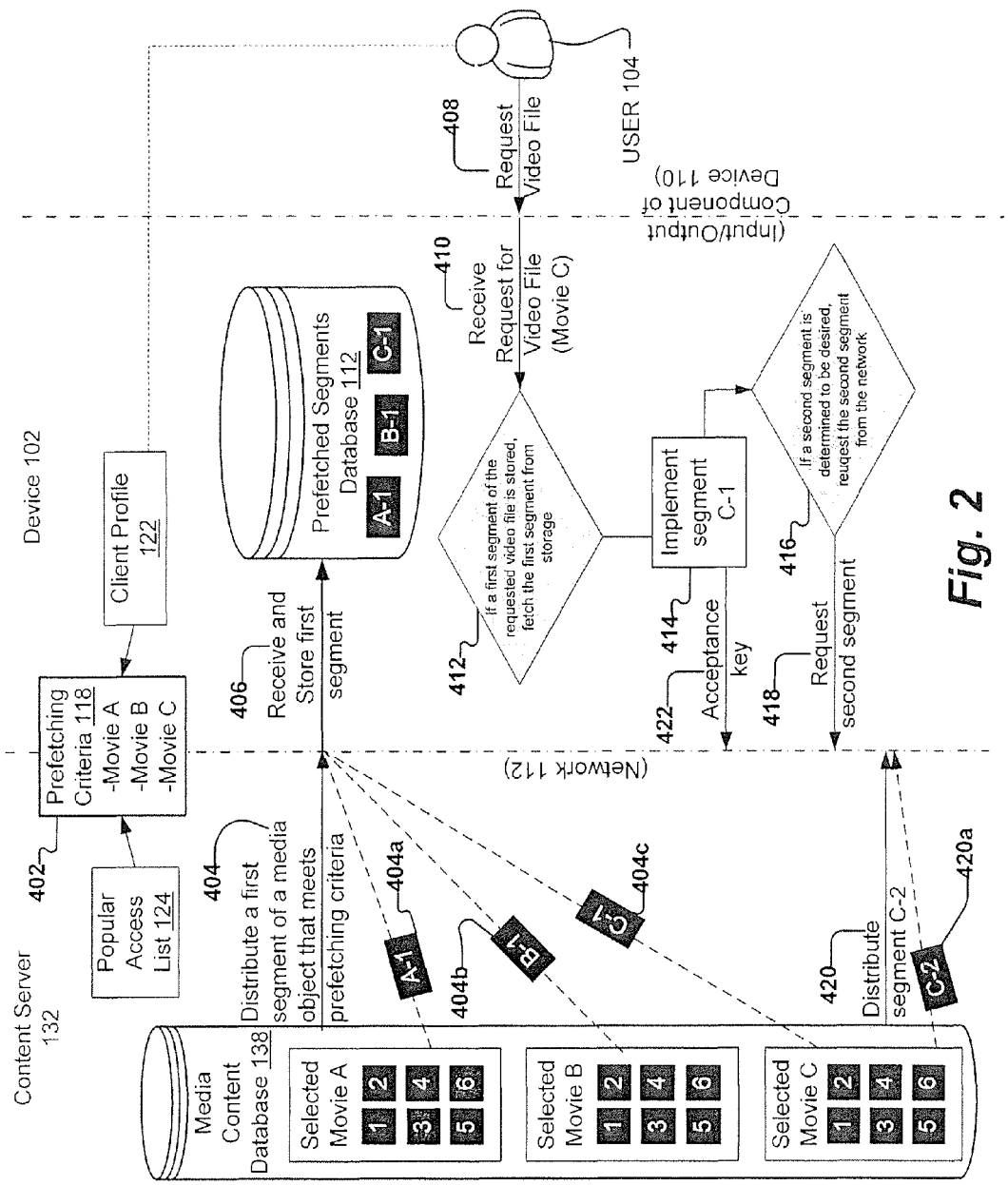
FIG. 2 depicts an example system and method for distributing media content to a device associated with a user.

FIG. 2 depicts an example system and method for distributing media content, in a non-requested instance, to a device 102 associated with a user 106 and further, requesting, from the device 102, another segment from a content server 132. At 402, pre-fetching criteria 118 is compiled. In this example embodiment, the pre-fetching criteria is compiled from a popular access list 124 and a client profile 122. Thus, for example, if the client profile includes a preference for movies that are comedies and new releases, the pre-fetching criteria may select popularly accessed new releases that are comedies for pre-fetching (e.g., Movies A, B, and C).

The content server, directed by a service provider or as part of its own processing, for example, can distribute a first segment of a media object at 404 that meets the pre-fetching criteria 118. In this example, Selected Movies A, B, and C from the media content database 138 meet the pre-fetching criteria. Thus, segments A-1, B-1, and C-1, shown at 404a, 404b, and 404c, are distributed from the content server 132 to the device 102 via the network 112. The device, at 406, receives the first segment of each of the media objects and stores them in the pre-fetched segments database 112. In this example, the device can be a set top box that is associated with a particular service, such as a cable utility, where the set top box connects to a content server 132 that is managed by the service provider.

The distribution from the content server 132 to the device 102 can be via any suitable method over the network, such as streaming or downloading. The distribution can take place during off peak hours when network congestion is low or there is a lot of available bandwidth for transmission. The content server 132 may select to distribute at any time, without request from the user. Thus, the media object segments may be received and stored by the device 102 at any time during connectivity to a distributing entity, such as the content server 132 or a managing service provider. The stored segments may be accessed weeks later or possibly never. Depending on the storage capacity, the device 102 may delete or drop segments over time or upon receipt of new segments.

At 408, a user 106, via the input/output component 110 of device 102, may request a video file. For example, the user 106 may be on a web site for a particular carrier and request media streaming for a movie, e.g., Movie C. The device 102 can receive the request at 410 and, at 412, the device 102 can check the pre-fetched segments database 112 to determine if a first segment of the requested movie file is stored. In this example, Movie C is media content that satisfied the pre-fetching criteria at 402 and was distributed at a prior time, at 404, to the device 102. Thus, the first segment of Movie C, C-1, is in storage. The device may implement the first segment C-1 at 414, such as by playing the segment in an appropriate viewer on a display component 104 of the device 102.

At 416, the device may determine if a second segment of Movie C is desired. This determination may be made in several ways. For example, if first segment is implemented by the device 102 at 414, the user can view or otherwise access the first segment. If the user accesses the first segment for a predetermined amount of time, this may trigger a request for a second segment of the media object, such as Movie C in this example. For example, if the segment of movie C-1 is 20 minutes long, if the user watches C-1 for 10 minutes or 50% of the segment, this may trigger a request to access the second segment. If the user stops the segment prior to the predetermined length, then the second stream is not requested, thus reducing unnecessary network traffic. The request for the second segment can be triggered immediately upon a user's request for media content if the media content includes a segment of a media object that is already stored on the user's local machine. A prompt to the user may solicit a response from the user to determine if the second segment should be requested, and the user's response may trigger the request for the second segment.

At 418, the device requests the second segment, C-2, from the content server 132, and the second segment C-2 is distributed to the device. The distribution to the device of any follow-on segments may be in any available method via the network, such as streaming, local caching, proxy caching, downloading, etc.

In an example embodiment, an acceptance key may be sent at 422 from the device to the content server 132 or service provider or the like. The acceptance key may be an indication that the user has implemented a first segment from storage, where the first segment was distributed as a result of the disclosed pre-fetching techniques. The transmission of the acceptance key could be triggered upon the implementation of the first segment by the device such that it triggers the distribution of a second segment, such as C-2. The acceptance key may be used, for example, by a service provider to determine when a user has accessed a segment provided by them for billing purposes.

Figure 3:
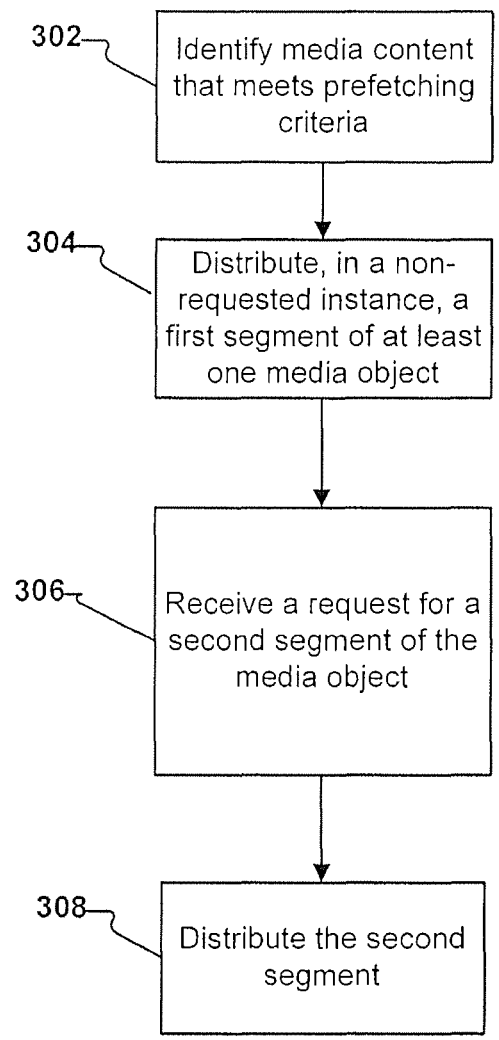
FIG. 3 depicts an example method of distributing media content that may be employed by a content server, for example.

FIG. 3 depicts an example method of distributing media content that may be employed by a content server, for example. In FIG. 3, an entity may identify media content that meets pre-fetching criteria at 302. The entity that identifies the pre-fetching criteria may be a user, a content server, a service provider, or the like, as described above. The selection of media content that meets pre-fetching criteria may initiate a distribution, at 304, of a first segment of at least one media object that makes up the media content. For example, if a particular movie or song meets pre-fetching criteria, a segment of that movie or that song may be distributed. The distribution occurs in a non-requested instance. In other words, the selection and distribution is often transparent to the user that receives the segment upon distribution. In contrast, at 306, the entity may receive a request for a second segment of the media object. The request may be a result of the user's access to the first segment, such as by viewing the movie or playing the song, and it may be triggered by predetermined length of access to that first segment. At 308, the entity can distribute the second segment using traditional methods, such as streaming, downloading, local caching, proxy caching, or the like.

Figure 4:
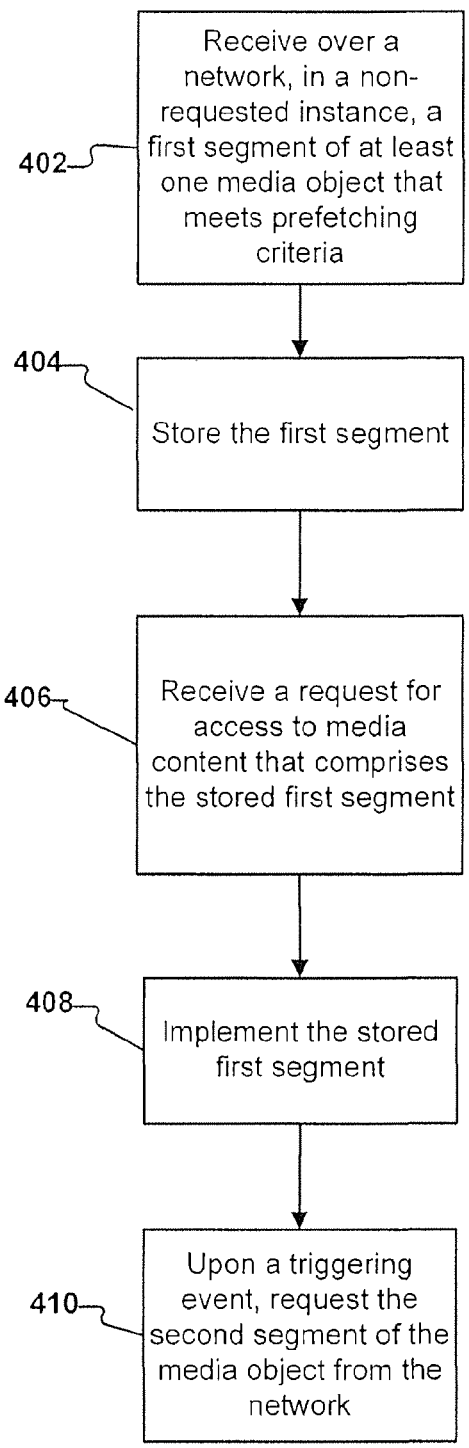
FIG. 4 depicts an example method of receiving media content that may be employed by a device.

FIG. 4 depicts an example method of distributing media content that may be employed by a device associated with a user, such as a set top box or a computing device. At 402, the device receives a first segment of at least one media object that meets pre-fetching criteria. Pre-fetching criteria may be based on many things, such as user preferences and tendencies, popular media, carrier-specific media, etc. Often, a request over the network is a request based on a user's request to stream the media content via a web browser or the like. Techniques are often employed to cache the currently-accessed media more quickly than it can be accessed by the user to eliminate or reduce delay to the user. However, in this instance, the segment is received over the network in a non-requested instance. Thus, the distribution to clients on the network is done based on pre-fetching criteria and may be transparent to a particular user.

At 404, upon receipt of the first segment, the user's device may store the first segment. At 406, the user requests access to media content, such as via a web browser or from a television guide selection. If that media content comprises the stored first segment, as a desirable occurrence of the disclosed techniques, the device implements the stored first segment at 408. Thus, instead of needing to stream the content from the network or a remote server, at least a first segment of the media content can be implemented directly from local storage. If, at 410, it is determined that the second segment is desired, the device may request the second segment of the media object from the network. The determination that the second segment is desired may be the result of a triggering event, such as the initial implementation of the first segment at 408, or the implementation of the first segment for a predetermined length of time, or the like.

The network over which the media is distributed may be a communications network, and the service provider could be the communications network provider. The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of channel assignment can be applied independently of the method for data transport, and do not depend on any particular network architecture, or underlying protocols.

Figure 5:
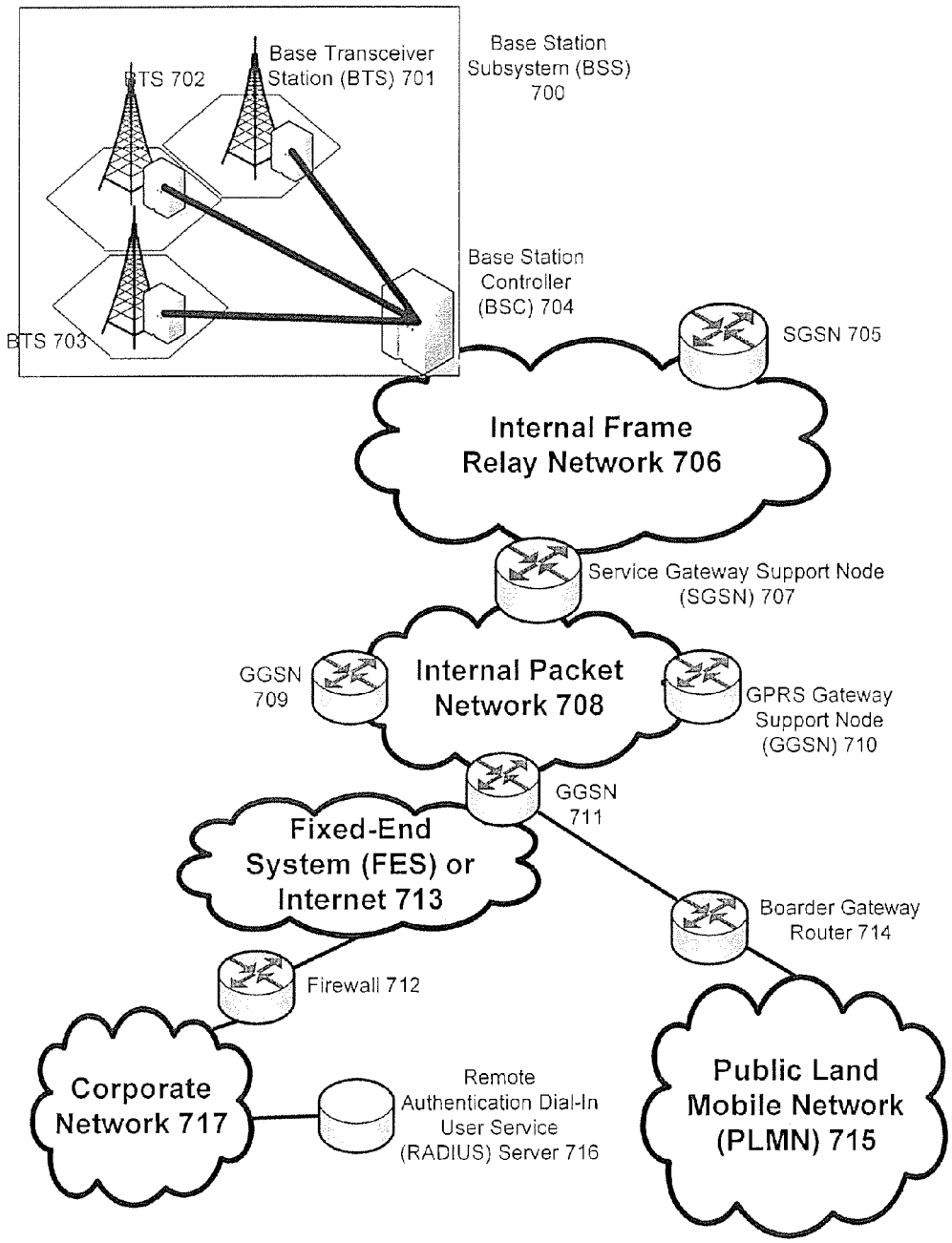
FIG. 5 depicts an overall block diagram of an exemplary packet-based mobile cellular network environment, such as a GPRS network.

FIG. 5 depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 700 (only one is shown in FIG. 5), each of which comprises a Base Station Controller ("BSC") 704 serving a plurality of Base Transceiver Stations ("BTS") such as, for example, the BTSs 701, 702 and 703. may be the access points where users of packet-based mobile devices become connected to the wireless network. In an embodiment, the packet traffic originating from user devices is transported over the air interface to the BTS 703, and from the BTS 703 to the BSC 704. Base station subsystems, such as the BSS 700, may be a part of internal frame relay network 706 that may include Service GPRS Support Nodes ("SGSN") such as the SGSN 705 and 707. Each SGSN 705, 707, etc. may be in turn connected to an internal packet network 708 through which the SGSN 705, 707, etc. can route data packets to and from a plurality of gateway GPRS support nodes (GGSN) 709, 710 and 711, etc.

As illustrated, the SGSN 707 and the GGSNs 709, 710 and 711 may be part of the internal packet network 708. Gateway GPRS serving nodes 709, 710 and 711 may provide an interface to external Internet Protocol ("IP") networks such as Public Land Mobile Network ("PLMN") 715, corporate intranets 717, Fixed-End System ("FES"), the public Internet 713 and/or the like. As illustrated, subscriber corporate network 717 may be connected to the GGSN 711 via a firewall 712; and the PLMN 715 may be connected to the GGSN 711 via a boarder gateway router 714. A Remote Authentication Dial-In User Service ("RADIUS") server 716 may be used for caller authentication when a user of a mobile cellular device calls corporate network 717, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

Figure 6:
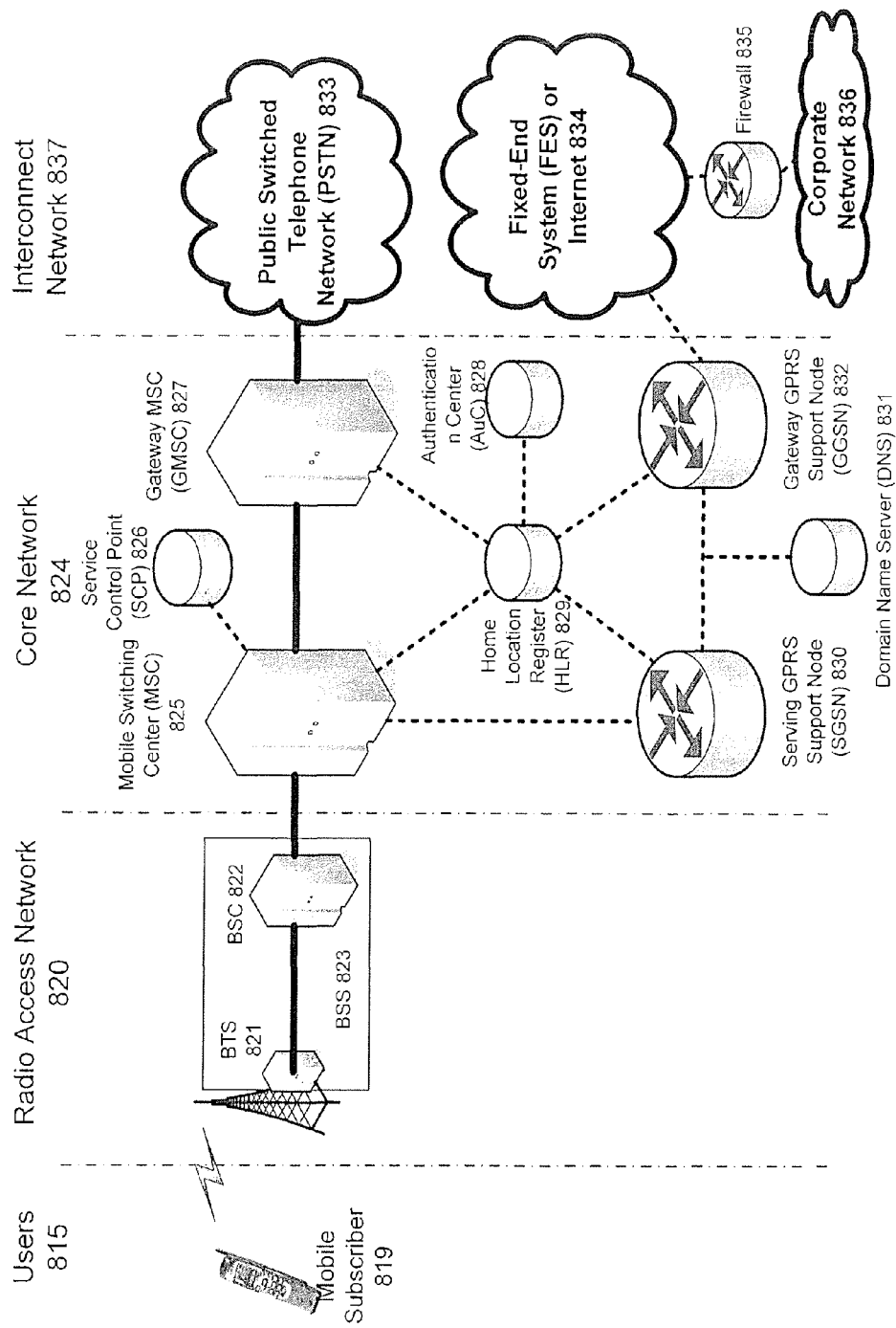
FIG. 6 illustrates an example alternate block diagram of an exemplary GSM/GPRS/IP multimedia network architecture in which medical information access techniques may be incorporated.

FIG. 6 illustrates the architecture of a typical GPRS network as segmented into four areas: users 815, radio access network 820, core network 824 and interconnect network 837. The users area 815 may include a plurality of end users. The radio access network are 820 may include a plurality of base station subsystems such as the BSSs 823, which include BTSs 821 and BSCs 822. The core network are 824 may include a host of various network elements. As illustrated here, the core network 824 may include a Mobile Switching Center ("MSC") 825, a Service Control Point ("SCP") 826, a gateway MSC 827, a SGSN 830, a Home Location Register ("HLR") 829, an Authentication Center ("AuC") 828, a Domain Name Server ("DNS") 831 and a GGSN 832. The interconnect network area 837 also may include networks and network elements. As illustrated in FIG. 6, the interconnect network are 837 may include a Public Switched Telephone Network ("PSTN") 833, a Fixed-End System ("FES") and/or the Internet 834, a firewall 835 and/or a Corporate Network 836.

A mobile switching center 825 may be connected to a large number of base station controllers. At MSC 825, for example, depending on the type of traffic, the traffic may be separated such that voice may be sent to Public Switched Telephone Network ("PSTN") 833 through Gateway MSC ("GMSC") 827, and/or data may be sent to the SGSN 830, which then sends the data traffic to the GGSN 832 for further forwarding.

When the MSC 825 receives call traffic, for example, from the BSC 822, it may send a query to a database hosted by the SCP 826. The SCP 826 may process the request and may issue a response to the MSC 825 so that it may continue call processing as appropriate.

The HLR 829 may be a centralized database for users to register with the GPRS network. The HLR 829 may store static information about the subscribers such as the International Mobile Subscriber Identity ("IMSI"), subscribed services, and/or a key for authenticating the subscriber. The HLR 829 may also store dynamic subscriber information such as the current location of the mobile subscriber. Associated with HLR 829 may be an AuC 828. The AuC 828 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 6, mobile subscriber 819 may initiate the attach process by turning on the network capabilities of the mobile device. An attach request may be sent by the mobile subscriber 819 to the SGSN 830. The SGSN 830 may query another SGSN, to which the mobile subscriber 819 may have been attached before, for the identity of the mobile subscriber 819. Upon receiving the identity of the mobile subscriber 819 from the other SGSN, the SGSN 830 may request more information from the mobile subscriber 819. This information may be used to authenticate the mobile subscriber 819 to the SGSN 830 by the HLR 829. Once the mobile subscriber 819 is verified, the SGSN 830 may send a location update to the HLR 829 indicating the change of location to a new SGSN, in this case the SGSN at 830. The HLR 829 may notify the old SGSN, to which the mobile subscriber 819 was attached, to cancel the location process for the mobile subscriber 819. The HLR 829 may then notify the SGSN 830 that the location update has been performed. At this time, the SGSN 830 may sends an "Attach Accept" message to the mobile subscriber 819, which in turn, may send an "Attach Complete" message to the SGSN 830.

After the attaching process, the mobile subscriber 819 may enter an authentication process. In the authentication process, the SGSN 830 may send authentication information to the HLR 829, which may send information back to the SGSN 830 based on the user profile that was part of the user's initial setup. The SGSN 830 may then send a request for authentication and ciphering to the mobile subscriber 819. The mobile subscriber 819 may use an algorithm to send the user identification (ID) and/or a password to the SGSN 830. The SGSN 830 may use the same algorithm to compare the result. If a match occurs, the SGSN 830 may authenticate the mobile subscriber 819.

Next, the mobile subscriber 819 may establish a user session with the destination network, for example, the corporate network 836, by going through a Packet Data Protocol ("PDP") activation process. The mobile subscriber 819 may request access to the Access Point Name ("APN"), for example, UPS.com, and the SGSN 830 may receive the activation request from the mobile subscriber 819. The SGSN 830 may then initiate a Domain Name Service ("DNS") query to learn which GGSN node has access to the UPS.com APN. The DNS query may be sent to the DNS server 831 within the core network 824 which may be provisioned to map to one or more GGSN nodes in the core network 824. Based on the APN, the mapped GGSN 832 may access the requested corporate network 836. The SGSN 830 may then send to the GGSN 832 a Create Packet Data Protocol ("PDP") Context Request message. The GGSN 832 may send a Create PDP Context Response message to the SGSN 830, which may then send an Activate PDP Context Accept message to the mobile subscriber 819.

Once activated, data packets of the call made by the mobile subscriber 819 may then go through radio access network 820, core network 824, and interconnect network 837, to reach corporate network 836.

Figure 7:
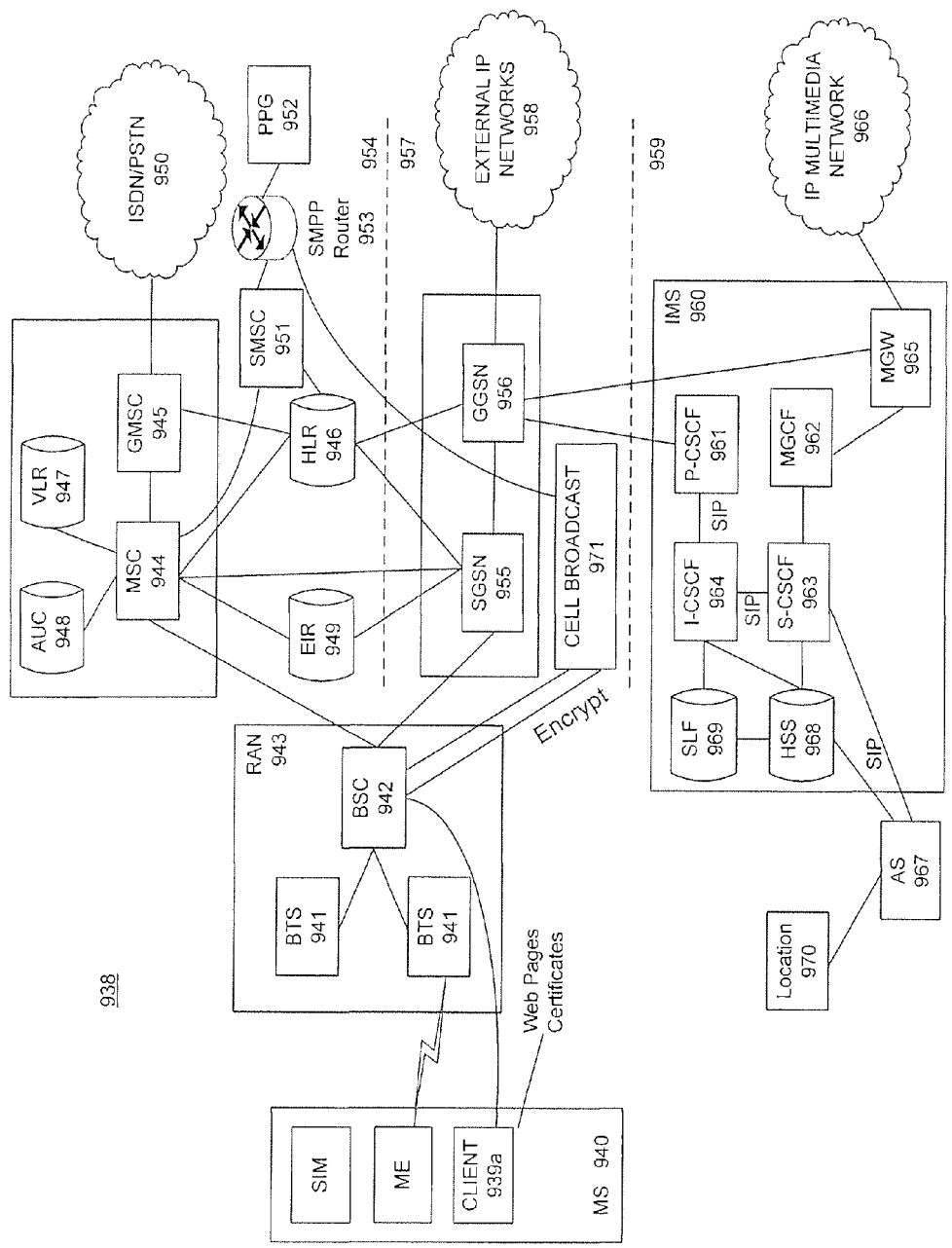
FIG. 7 illustrates another exemplary block diagram view of a GSM/GPRS/IP multimedia network architecture.

FIG. 7 shows another example block diagram view of a GSM/GPRS/IP multimedia network architecture 938. As illustrated, the architecture 938 of FIG. 7 includes a GSM core network 954, a GPRS network 957 and/or an IP multimedia network 959. The GSM core network 954 may include a Mobile Station (MS) 940, at least one Base Transceiver Station (BTS) 941, and/or a Base Station Controller (BSC) 942. The MS 940 may be Mobile Equipment (ME), such as a mobile phone and/or a laptop computer 202c that is used by mobile subscribers, with a Subscriber identity Module (SIM). The SIM may include an International Mobile Subscriber Identity (IMSI), which may include a unique identifier of a subscriber. The BTS 941 may be physical equipment, such as a radio tower, that enables a radio interface to communicate with the MS 940. Each BTS may serve more than one MS 940. The BSC 942 may manage radio resources, including the BTS 941. The BSC 942 may be connected to several BTS 941. The BSC 942 and BTS 941 components, in combination, are generally referred to as a base station (BS) and/or a radio access network (RAN) 943.

The GSM core network 954 may include a Mobile Switching Center (MSC) 944, a Gateway Mobile Switching Center (GMSC) 945, a Home Location Register (HLR) 946, a Visitor Location Register (VLR) 947, an Authentication Center (AuC) 949, and an Equipment Identity Register (EIR) 948. The MSC 944 may perform a switching function for the network. The MSC may performs other functions, such as registration, authentication, location updating, handovers, and call routing. The GMSC 945 may provide a gateway between the GSM network and other networks, such as an Integrated Services Digital Network (ISDN) or a Public Switched Telephone Network (PSTN) 950. In other words, the GMSC 945 may provide interworking functionality with external networks.

The HLR 946 may include a database that contains administrative information regarding each subscriber registered in a corresponding GSM network. The HLR 946 may contain the current location of each mobile subscriber. The VLR 947 may include a database that contains selected administrative information from the HLR 946. The VLR may contain information necessary for call control and provision of subscribed services for each mobile subscriber currently located in a geographical area controlled by the VLR 947. The HLR 946 and the VLR 947, together with MSC 944, may provide call routing and roaming capabilities of the GSM network. The AuC 948 may provide parameters for authentication and/or encryption functions. Such parameters may allow verification of a subscriber's identity. The EIR 949 may store security-sensitive information about the mobile equipment.

The Short Message Service Center (SMSC) 951 may allow one-to-one Short Message Service (SMS) messages to be sent to/from the mobile subscriber 940. For example, the Push Proxy Gateway (PPG) 952 may be used to "push" (i.e., send without a synchronous request) content to mobile subscriber 902. The PPG 952 may act as a proxy between wired and wireless networks to facilitate pushing of data to MS 940. Short Message Peer to Peer (SMPP) protocol router 953 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 940 may first registers with the network to indicate its current location by performing a location update and IMSI attach procedure. MS 940 may send a location update including its current location information to the MSC/VLR, via the BTS 941 and the BSC 942. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 957 may be logically implemented on the GSM core network architecture by introducing two packet-switching network nodes, a serving GPRS support node (SGSN) 955 and a cell broadcast and a Gateway GPRS support node (GGSN) 956. The SGSN 955 may be at the same hierarchical level as the MSC 944 in the GSM network. The SGSN may control the connection between the GPRS network and the MS 940. The SGSN may also keep track of individual MS locations, security functions, and access controls.

The Cell Broadcast Center (CBC) 971 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 956 may provides a gateway between the GPRS network and a public packet network (PDN) or other IP networks 958. That is, the GGSN may provide interworking functionality with external networks, and may set up a logical link to the MS through the SGSN. When packet-switched data leaves the GPRS network, it is transferred to external TCP-IP network 958, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 957 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

IP multimedia network 959 was introduced with 3GPP Release 5, and includes IP multimedia subsystem (IMS) 960 to provide rich multimedia services to end users. A representative set of the network entities within IMS 960 are a call/session control function (CSCF), media gateway control function (MGCF) 962, media gateway (MGW) 965, and a master subscriber database, referred to as a home subscriber server (HSS) 968. HSS 968 may be common to GSM network 954, GPRS network 957 as well as IP multimedia network 959.

IP multimedia system 960 is built around the call/session control function, of which there are three types: interrogating CSCF (I-CSCF) 964, proxy CSCF (P-CSCF) 961 and serving CSCF (S-CSCF) 963. P-CSCF 961 may be the MS's first point of contact with IMS 960. P-CSCF 961 forwards session initiation protocol (SIP) messages received from the MS to an SIP server in a home network (and vice versa) of the MS. P-CSCF 961 may also modify an outgoing request according to a set of rules defined by the network operator (for example, address analysis and potential modification).

The I-CSCF 964 may be an entrance to a home network, may hide the inner topology of the home network from other networks, and may provides flexibility for selecting an S-CSCF. The I-CSCF 964 may contact subscriber location function (SLF) 969 to determine which HSS 968 to use for the particular subscriber, if multiple HSSs 968 are present. The S-CSCF 963 may perform the session control services for the MS 940. This includes routing originating sessions to external networks and routing terminating sessions to visited networks. S-CSCF 963 may also decide whether application server (AS) 967 is required to receive information on an incoming SIP session request to ensure appropriate service handling. This decision may be based on information received from HSS 968 (or other sources, such as application server 967). The AS 967 also communicates to location server 970 (e.g., a Gateway Mobile Location Center (GMLC)) that provides a position (e.g., latitude/longitude coordinates) of the MS 940.

The HSS 968 may contain a subscriber profile and may keep track of which core network node is currently handling the subscriber. It may also support subscriber authentication and authorization functions (AAA). In networks with more than one HSS 968, a subscriber location function provides information on HSS 968 that contains the profile of a given subscriber.

The MGCF 962 may provide interworking functionality between SIP session control signaling from IMS 960 and ISUP/BICC call control signaling from the external GSTN networks (not shown). It also may control the media gateway (MGW) 965 that provides user-plane interworking functionality (e.g., converting between AMR- and PCM-coded voice). The MGW 965 may communicate with other IP multimedia networks 966.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

Figure 8:
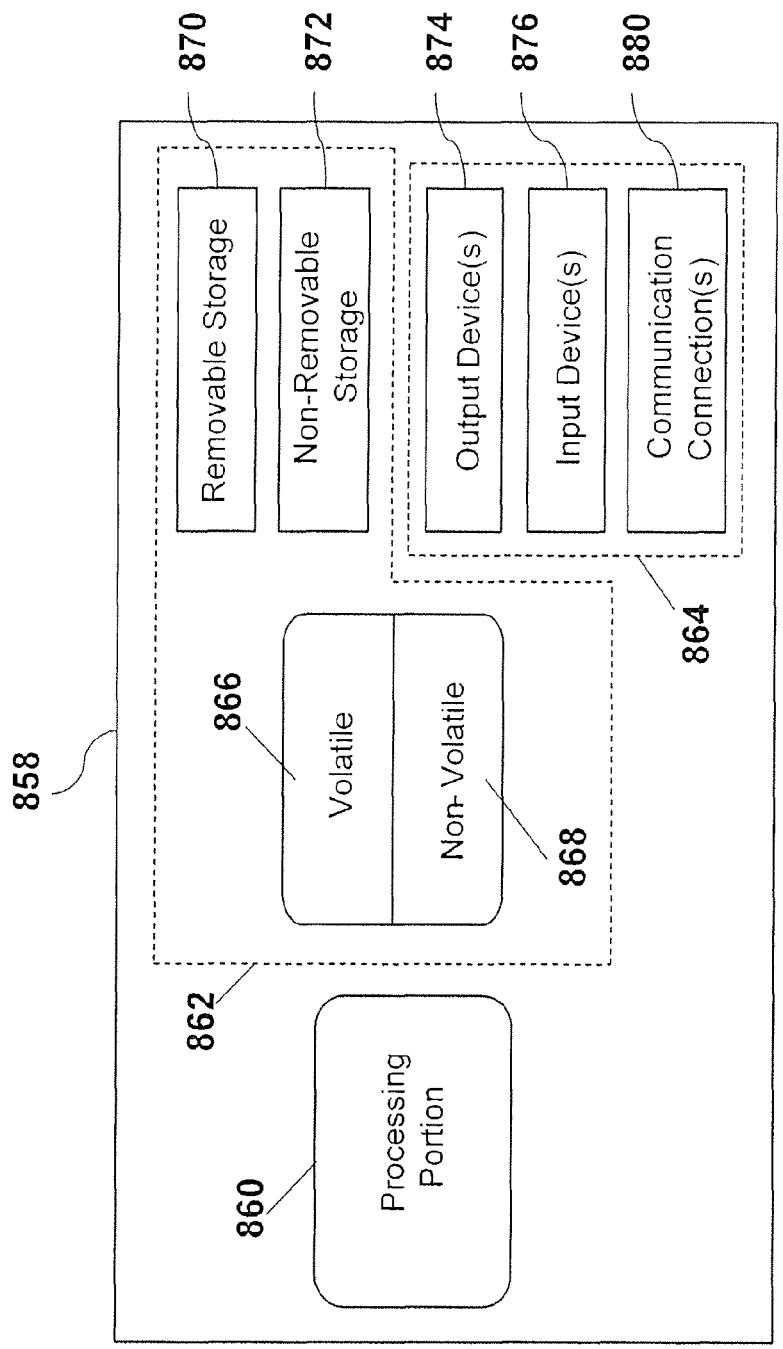
FIG. 8 is a block diagram of an example processor which may be employed in any of the embodiments disclosed herein.

FIG. 8 is a block diagram of an example processor 858 which may be employed in any of the embodiments described herein, including as one or more components of the device 102 or content server 132, for example. Processor 858 may also be one or more components within network 114. It is emphasized that the block diagram depicted in FIG. 8 is exemplary and not intended to imply a specific implementation. Thus, the processor 858 can be implemented in a single processor or multiple processors. Multiple processors can be distributed or centrally located. Multiple processors can communicate wirelessly, via hard wire, or a combination thereof.

The processor 858 comprises a processing portion 860, a memory portion 862, and an input/output portion 864. The processing portion 860, memory portion 862, and input/output portion 864 are coupled together (coupling not shown in FIG. 8) to allow communications therebetween. The input/output portion 864 is capable of providing and/or receiving components utilized to store pre-fetched media segments, receive and/or transmit an acceptance key, receive additional media segments, or the like. For example, the input/output portion 864 is capable of providing/receiving device 106 communications downloads, accepting/receiving inputs from a user 102, transmitting/receiving requests for media content, or any combination thereof, as described above.

The processor 858 can be implemented as a client processor and/or a server processor. In a basic configuration, the processor 858 may include at least one processing portion 860 and memory portion 862. The memory portion 862 can store any information utilized in conjunction with transmitting, receiving, and/or processing media content, such as segments of a particular media object, determining whether further segments should be requested, and/or processing associated communications. For example, depending on the device, as described above, the memory portion is capable of storing pre-fetching criteria, segments of media objects, or whole media contents. Depending upon the exact configuration and type of processor, the memory portion 862 can be volatile (such as RAM) 866, non-volatile (such as ROM, flash memory, etc.) 868, or a combination thereof. The processor 858 can have additional features/functionality. For example, the processor 858 can include additional storage (removable storage 870 and/or non-removable storage 872) including, but not limited to, magnetic or optical disks, tape, flash, smart cards or a combination thereof. Computer storage media, such as memory and storage elements 862, 870, 872, 866, and 868, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 858. Any such computer storage media can be part of the processor 858.

The processor 858 can also contain the communications connection(s) 880 that allow the processor 858 to communicate with other devices, for example through network 120. Communications connection(s) 880 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 858 also can have input device(s) 876 such as keyboard, keypad, mouse, pen, voice input device, touch input device, etc. Output device(s) 874 such as a display, speakers, printer, etc. also can be included.

The methods and apparatus for distributing and receiving segments of a media object can be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing information pertaining to a motor vehicle. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, the methods and apparatus for pre-fetching media content, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present subject matter. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

While the present subject matter has been described in connection with the various embodiments of the various Figs, it is to be understood that other similar embodiments can be used or modifications and additions can be made to the described embodiment for performing the same function of distributing or storing media content without deviating therefrom. For example, one skilled in the art will recognize that a system for distributing media content as described can apply to any environment, whether wired or wireless, and can be applied to any number of devices connected via a communications network and interacting across the network. Therefore, distributing content that meets pre-fetching criteria and receiving and storing such content should not be limited to any single embodiment, but rather should be construed in breadth and scope in accordance with the appended claims.

What is claimed:

1. A method comprising:
  receiving from a network, prior to a user request for any portion of media content being selected for distribution upon the user request, a first segment of at least one media object that meets pre-fetching criteria, wherein:
    the first segment is received out of band on a separate data stream;

at least one portion of the media content comprises the at least one media object; and the pre-fetching criteria indicates that the first segment of the at least one media object is to be stored prior to the user request for the media content;

receiving, after the user request for the media content, a second segment of the at least one media object;

storing the first segment of the at least one media object in directly accessible noncache storage;

when the user request is for the at least one portion of the media content that comprises the stored first segment of the at least one media object, implementing the first segment from the noncache storage; and when there is an indication that the second segment is desired, request, via the network, the second segment of the at least one media object.

2. The method of claim 1, wherein implementing the first segment from the noncache storage comprises at least one of reading, playing, or displaying at least one of text, audio, images, animation, video, or interactivity content.

3. The method of claim 1, wherein the indication that the second segment is desired is a result of a user's access to the first segment.

4. The method of claim 1, wherein the indication that the second segment is desired is a result of an implementation of a predetermined length of the first segment.

5. The method of claim 1, further comprising receiving the first segment from the network based on a network balance criteria.

6. The method of claim 1, wherein the pre-fetching criteria is compiled in accordance with at least one of a client profile, an access request history, a popular access list, or a carrier selected list.

7. The method of claim 1, wherein the second segment is received from the network via at least one of streaming, caching, broadcasting, multicasting, or downloading.

8. The method of claim 1, providing an acceptance key that indicates a user acceptance of the first segment, to a carrier over the network.

9. A method comprising:

distributing, prior to a user request for any portion of media content being selected for distribution upon the user request, a first segment of at least one media object based on pre-fetching criteria, wherein:

the first segment is distributed out of band on a separate data stream;

at least one portion of the media content comprises the at least one media object;

the first segment is configured to be received and stored in a local directly accessible noncache storage of a client's device; and the pre-fetching criteria indicates that the first segment of the at least one media object is to be distributed prior to a user request for the media content;

receiving, after the user request for the media content, a request for a second segment of the at least one media object;

identifying the media content that meets the pre-fetching criteria; and when the request for the second segment of the at least one media object is received, initiating a distribution of the second segment.

10. The method of claim 9, wherein the pre-fetching criteria is compiled in accordance with at least one of a client profile, an access request list, a popular access list, or a carrier preferred list.

11. The method of claim 9, wherein the pre-fetching criteria is provided from a client device.

12. The method of claim 9, retrieving the first segment and the second segment from a content server.

13. The method of claim 9, wherein distributing the first segment and the second segment comprises at least one of streaming, caching, broadcasting, multicasting, or downloading the segments.

14. The method of claim 9, distributing the first segment from a network based on a network balance criteria.

15. The method of claim 9, wherein the request for the second segment is an indication received that a user has accepted an acceptance key upon access to the first segment.

16. An apparatus comprising:

a processor; and memory coupled to the processor, the memory comprising executable instructions that when executed by the processor cause the processor to effectuate operations comprising:

identifying media content that meets pre-fetching criteria, wherein at least one portion of the media content comprises at least one media object, and wherein the pre-fetching criteria indicates that a first segment of the at least one media object is to be distributed out of band on a separate data stream prior to a user request for any portion of the media content;

distributing, prior to the user request for any portion of the media content being selected for distribution upon the user request, the first segment of the at least one media object, wherein the first segment is configured to be stored in a local directly accessible noncache storage of a device of the user; and upon receipt of a request for a second segment of the at least one media object, after the user request for media content, initiating a distribution of the second segment.

17. The apparatus of claim 16, wherein the pre-fetching criteria is compiled in accordance with at least one of a client profile, an access request history, a popular access list, or a carrier selected list.

18. The apparatus of claim 16, the operations further comprising distributing the first segment and the second segment via at least one of streaming, caching, broadcasting, multicasting, or downloading.

19. The apparatus of claim 16, the operations further comprising distributing the first segment from a network based on a network balance criteria.

20. The apparatus of claim 16, wherein the request for the second segment is an indication received that a user accepted an implementation of a predetermined length of the first segment.

* * * * *